(12) United States Patent
Farrell

(10) Patent No.: US 12,739,116 B2
(45) Date of Patent: Sep. 15, 2026

(54) IN-VEHICLE DEVICE MANAGEMENT SYSTEM

(71) Applicant: GM Global Technology Operations LLC, Detroit, MI (US)

(72) Inventor: Brian Farrell, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/042,809

(22) Filed: Jan. 31, 2025

(65) Prior Publication Data

US 2026/0230318 A1 Aug. 6, 2026

(51) Int. Cl.
*H04L 9/08* (2006.01)
*H04L 9/32* (2006.01)

(52) U.S. Cl.
CPC .......... *H04L 9/0894* (2013.01); *H04L 9/0861* (2013.01); *H04L 9/3273* (2013.01)

(58) Field of Classification Search
CPC .... H04L 9/0894; H04L 9/0861; H04L 9/3273
See application file for complete search history.

(56) References Cited

U.S. PATENT DOCUMENTS 12,432,185 B2 * 9/2025 Li .......................... H04L 67/12
2023/0129603 A1 * 4/2023 Ujiie ...................... H04L 9/088
2023/0396417 A1 * 12/2023 Junk ..................... H04L 9/3247
2024/0323016 A1 * 9/2024 Lambert ............... H04L 9/0841
2025/0378181 A1 * 12/2025 Afshar ................. G06F 21/602

FOREIGN PATENT DOCUMENTS

DE 102024202305 A1 * 9/2024 ........... H04W 76/10
DE 102024106735 B3 * 7/2025 ............... H04L 9/40

* cited by examiner

*Primary Examiner* — Luu T Pham
*Assistant Examiner* — Paul J Skwierawski
(74) *Attorney, Agent, or Firm* — Honigman LLP; Matthew H. Szalach

(57) ABSTRACT

A method causes the data processing hardware to perform operations including provisioning in-vehicle secret keys to in-vehicle devices, receiving a responder ID, providing a host public key and the responder ID to one of one or more of the in-vehicle devices, a secure element of the host ECU, or one of the in-vehicle devices, generating, at each of the in-vehicle devices, a device MAC over the responder ID using a responder KDF key, sending a request including a responder production secret key to a responder, receiving a responder service secret key at the host ECU, verifying a legitimacy of the responder, generating a random number corresponding to a new responder production secret key encrypted with the responder service secret key, sending the generated random number to the responder, receiving a confirmation from the responder, and removing the responder KDF keys at each of the plurality of devices.

20 Claims, 13 Drawing Sheets

IN-VEHICLE DEVICE MANAGEMENT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an in-vehicle device management system.

Vehicles are often equipped with various devices that each utilize independent controllers. These devices are often supplied by independent manufacturers (i.e., "suppliers") to a vehicle manufacturer and are installed during assembly of the vehicle. In some instances, the devices may be replaced during servicing of the vehicle. The devices may be configured to execute safety or other critical functions of the vehicle, such that security of the devices is important. However, the devices are resource constrained in that there is limited memory for executing diagnostics on the devices. As a result, the devices are typically free from separate programming or provisioning to ensure the legitimacy of the devices upon installation. The vehicle manufacturer is thus accepting the devices from the supplier under the assumption that the devices are legitimate and are free from tampering, such as malware. Thus, there is a need for an improved system for monitoring and validating devices provided from suppliers during assembly of vehicles.

SUMMARY

In some aspects, a computer-implemented method when executed by data processing hardware causes the data processing hardware to perform operations. The operations include provisioning, via a provisioning application, in-vehicle secret keys to a plurality of in-vehicle devices, receiving, at a host electronic control unit (ECU), at least one responder identifier (ID), providing, via the host ECU, a host public key and the at least one responder ID to one of one or more of the plurality of in-vehicle devices, a secure element of the host ECU, or one of the plurality of in-vehicle devices, and generating, at each of the plurality of in-vehicle devices, a device message authentication code (MAC) over the at least one responder ID using a responder key derivation function (KDF) key. The operations also include sending, via the host ECU, a request including a responder production secret key to a responder, receiving, in response to the request, a responder service secret key at the host ECU, the responder service secret key being encrypted with the responder production secret key, verifying, at the host ECU, a legitimacy of the responder, and generating, at the host ECU, a random number corresponding to a new responder production secret key encrypted with the responder service secret key. The operations further include sending the generated random number to the responder, receiving, at the host, a confirmation from the responder, and removing, in response to the confirmation, the responder KDF keys at each of the plurality of devices.

In some examples, providing the host public key and the at least one responder ID may include generating a device MAC with an in-vehicle secret key of the host ECU. Optionally, generating the device MAC may include generating the device MAC over the at least one responder ID and encrypting the device MAC with the host public key. The operations may also include providing, via each of the plurality of in-vehicle devices, the encrypted device MAC to the host ECU, the encrypted device MAC including a device-unique secret. The operations may further include decrypting, via the host ECU, the encrypted device MAC. In some instances, receiving the responder service secret key may include receiving an encrypted responder MAC from the responder. Optionally, verifying the legitimacy of the responder may include decrypting the encrypted responder MAC and the encrypted responder service secret key from the responder using the responder production secret key and storing the responder service secret key in memory hardware of the host ECU. The operations may also include requesting, via the host ECU, a challenge from a secure environment of the host ECU and generating a MAC over the challenge using an attestation key, the attestation key generated via a cryptographic algorithm using the responder service secret key.

In other examples, the operations may include providing, at the responder, the challenge, verifying the challenge via the responder, and providing, via the responder, a response with a MAC generated using the attestation key derived from the responder service secret key to the host ECU. The operations may further include receiving, at the host ECU, responder software selectively including calibration data from a programming tool, providing, from the host ECU, a signed header to a secure environment of the host verified using the host public key, and writing, via the host, the responder software at a memory hardware of the host ECU. The operations may include executing, via a programming tool, a diagnostic routine, receiving, at the programming tool, a host ID and the responder ID, obtaining, from a back-office security server, the responder service secret key, verifying, at the host ECU, the responder service secret key, and providing, via the host ECU, a positive response to the diagnostic routine to the programming tool.

In other aspects, an in-vehicle device management system includes data processing hardware and memory hardware in communication with the data processing hardware. The memory hardware stores instructions that when executed on the data processing hardware cause the data processing hardware to perform operations. The operations include provisioning, via a provisioning application, in-vehicle secret keys to a plurality of in-vehicle devices, receiving, at a host electronic control unit (ECU), at least one responder identifier (ID), providing, via the host ECU, a host public key and the at least one responder ID to each of the plurality of in-vehicle devices, and generating, at each of the plurality of in-vehicle devices, a device message authentication code (MAC) over the at least one responder ID using a responder key derivation function (KDF) key. The operations also include sending, via the host ECU, a request including a responder production secret key to a responder, receiving, in response to the request, a responder service secret key at the host ECU, the responder service secret key being encrypted with the responder production secret key, verifying, at the host ECU, a legitimacy of the responder, and generating, at the host ECU, a random number corresponding to a new responder production secret key encrypted with the responder service secret key. The operations further include sending the generated random number to the responder, receiving, at the host ECU, a confirmation from the responder, removing, in response to the confirmation, the responder KDF keys at each of the plurality of devices, and requesting, via the host ECU, a challenge from a secure environment of the host ECU. The operations also include generating a MAC over the challenge using an attestation key, the attestation key generated via a cryptographic algorithm using the responder service secret key, receiving, at the host ECU, responder software selectively including calibration data from a programming tool, providing, from the host ECU, a signed header to the secure environment of the host ECU verified using the host public key, and writing, via the host ECU, the responder software at the memory hardware of the host ECU.

In some examples, providing the host public key and the at least one responder ID may include generating the device MAC with an in-vehicle secret key of the host ECU. Optionally, generating the device MAC may include generating the device MAC over the at least one responder ID using the responder KDF keys and includes encrypting the device MAC with the host public key and the at least one responder ID. The operations may also include providing, via each of the plurality of in-vehicle devices, the encrypted device MAC to the host ECU, the encrypted device MAC including a device-unique secret. The operations may further include decrypting, via the host ECU, the encrypted device MAC. In some instances, receiving the responder service secret key may include receiving an encrypted responder MAC from the responder. Optionally, verifying the legitimacy of the responder may include decrypting the encrypted responder MAC and the encrypted responder service secret key from the responder using the responder production secret key and storing the responder service secret key in memory hardware of the host ECU. The operations may include providing, at the responder, the challenge, verifying the challenge via the responder, and providing, via the responder, the attestation key derived from the responder service secret key to the host ECU. The operations may further include executing, via a programming tool, a diagnostic routine, receiving, at the programming tool, a host ID and the responder ID, obtaining, from a back-office security server, the responder service secret key, verifying, at the host ECU, the responder service secret key, and providing, via the host ECU, a positive response to the diagnostic routine to the programming tool.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
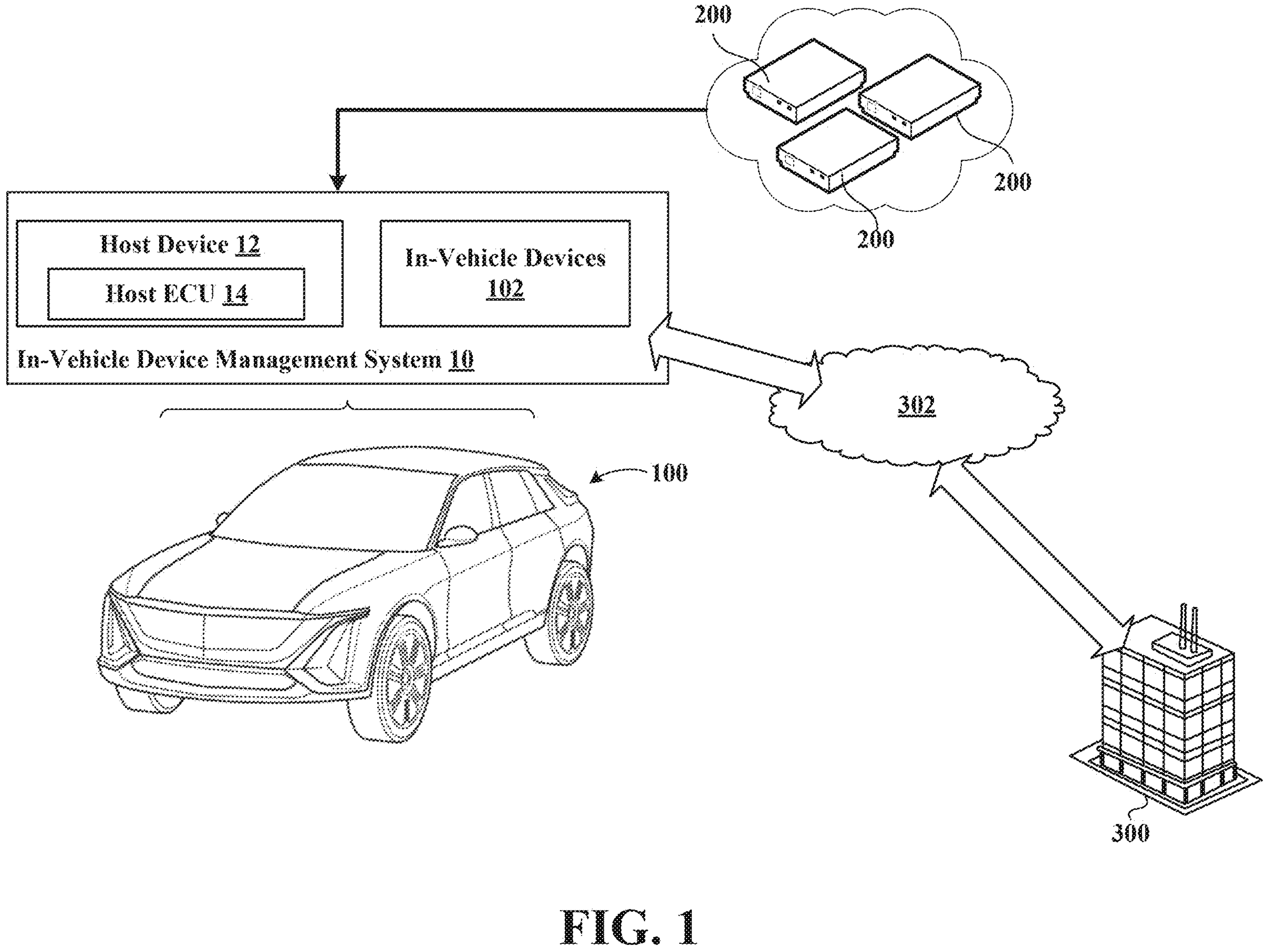
FIG. 1 is a schematic diagram of a vehicle equipped with an in-vehicle device management system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
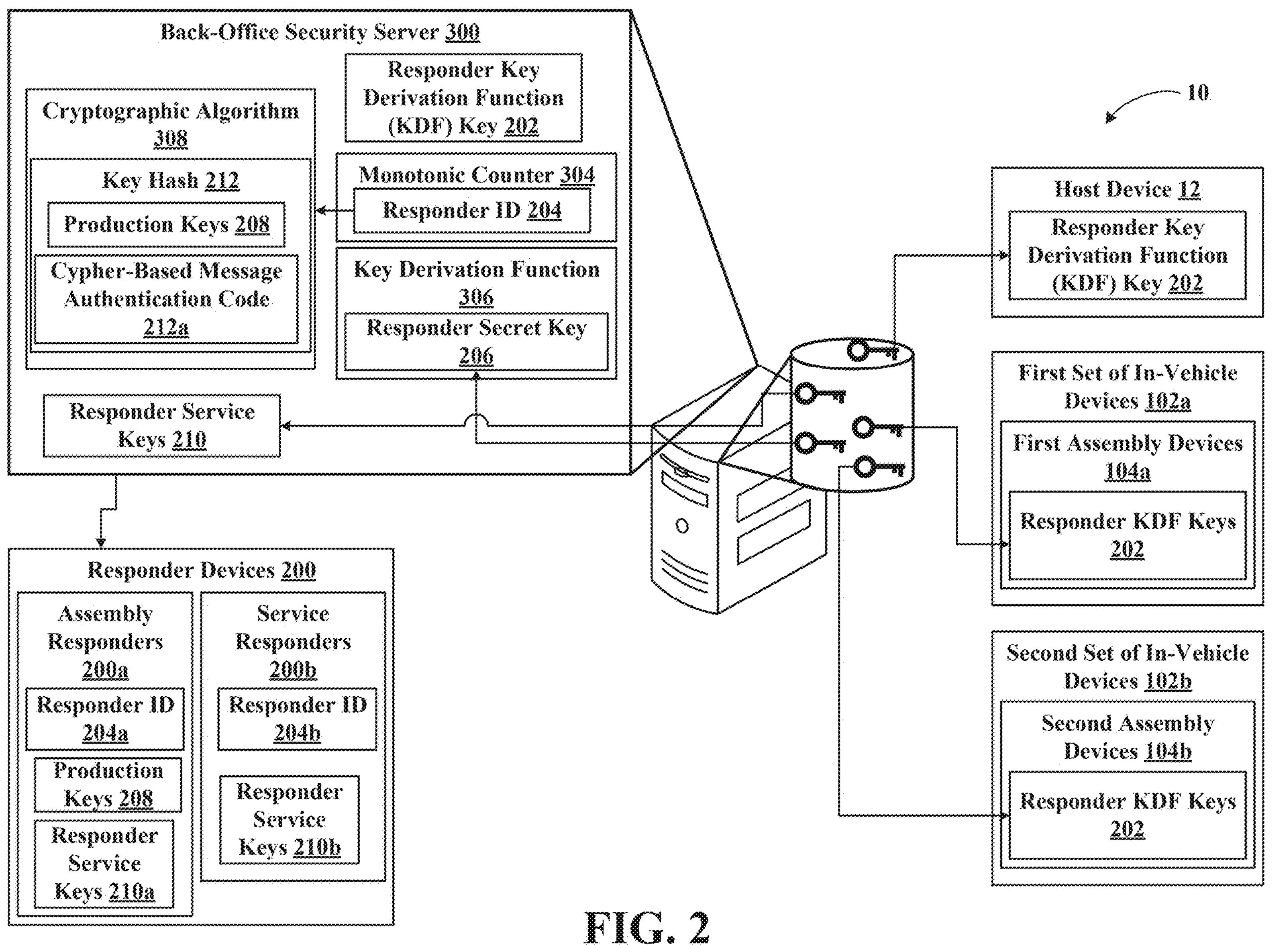
FIG. 2 is a schematic diagram of an in-vehicle device management system according to the present disclosure illustrating a key provisioning process between a back-office security server and vehicle devices.
Figure 3:
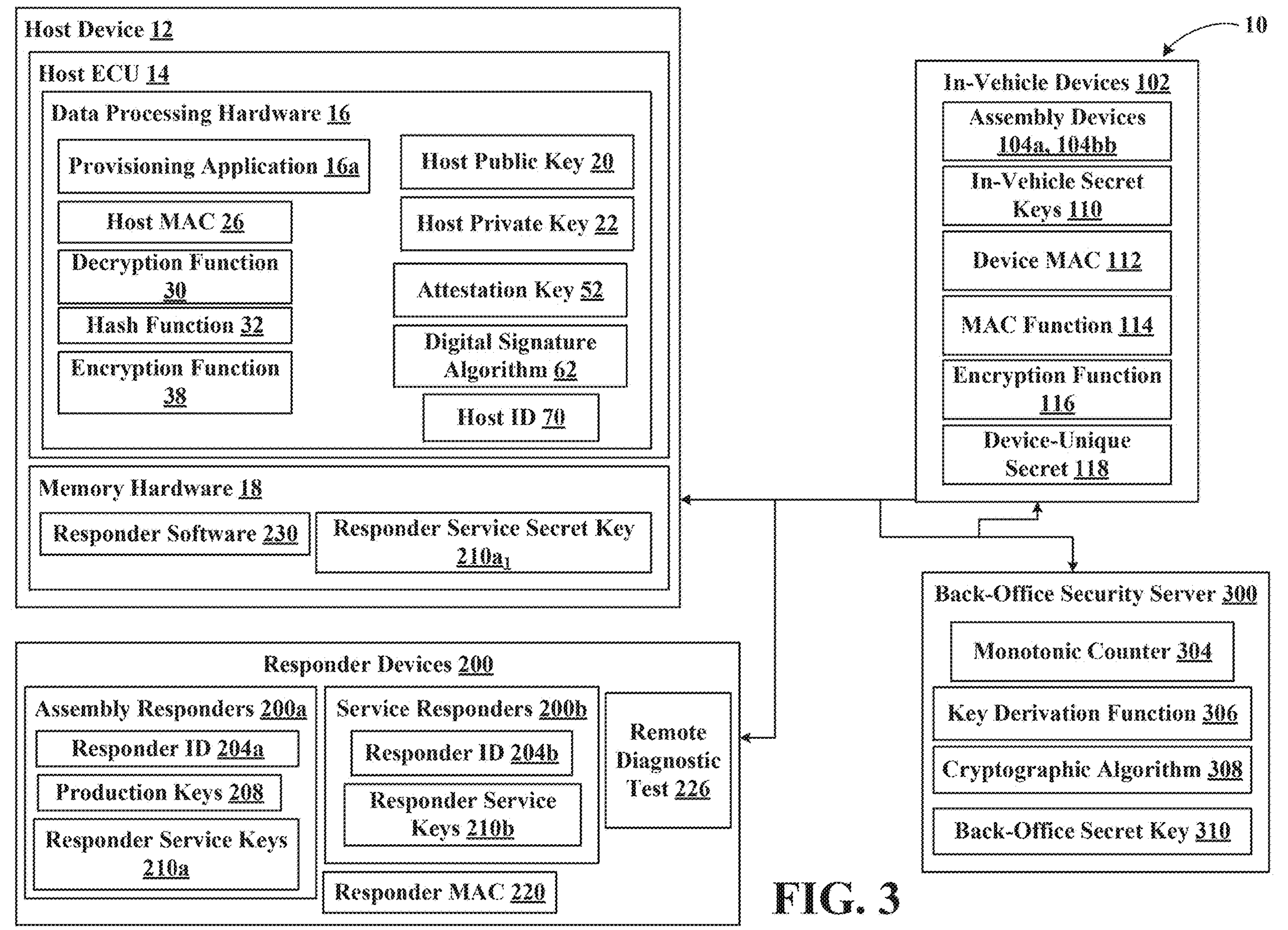
FIG. 3 is an exemplary block diagram of an in-vehicle device management system according to the present disclosure.
Figure 4:
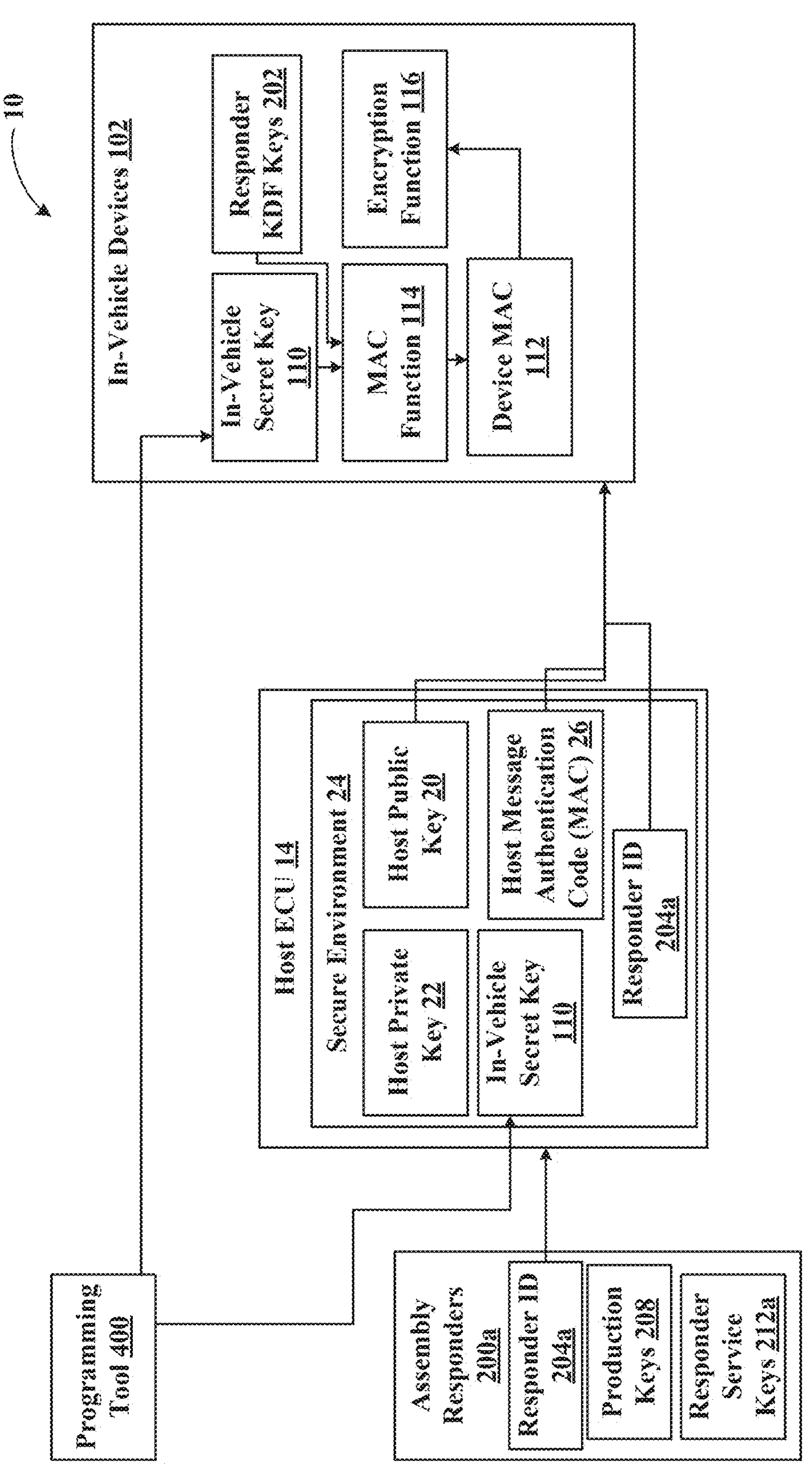
FIGS. 4-7 are schematic diagrams of an in-vehicle device management system according to the present disclosure illustrating key establishment between a plurality of in-vehicle devices, a host, and at least one responder.
Figure 5:
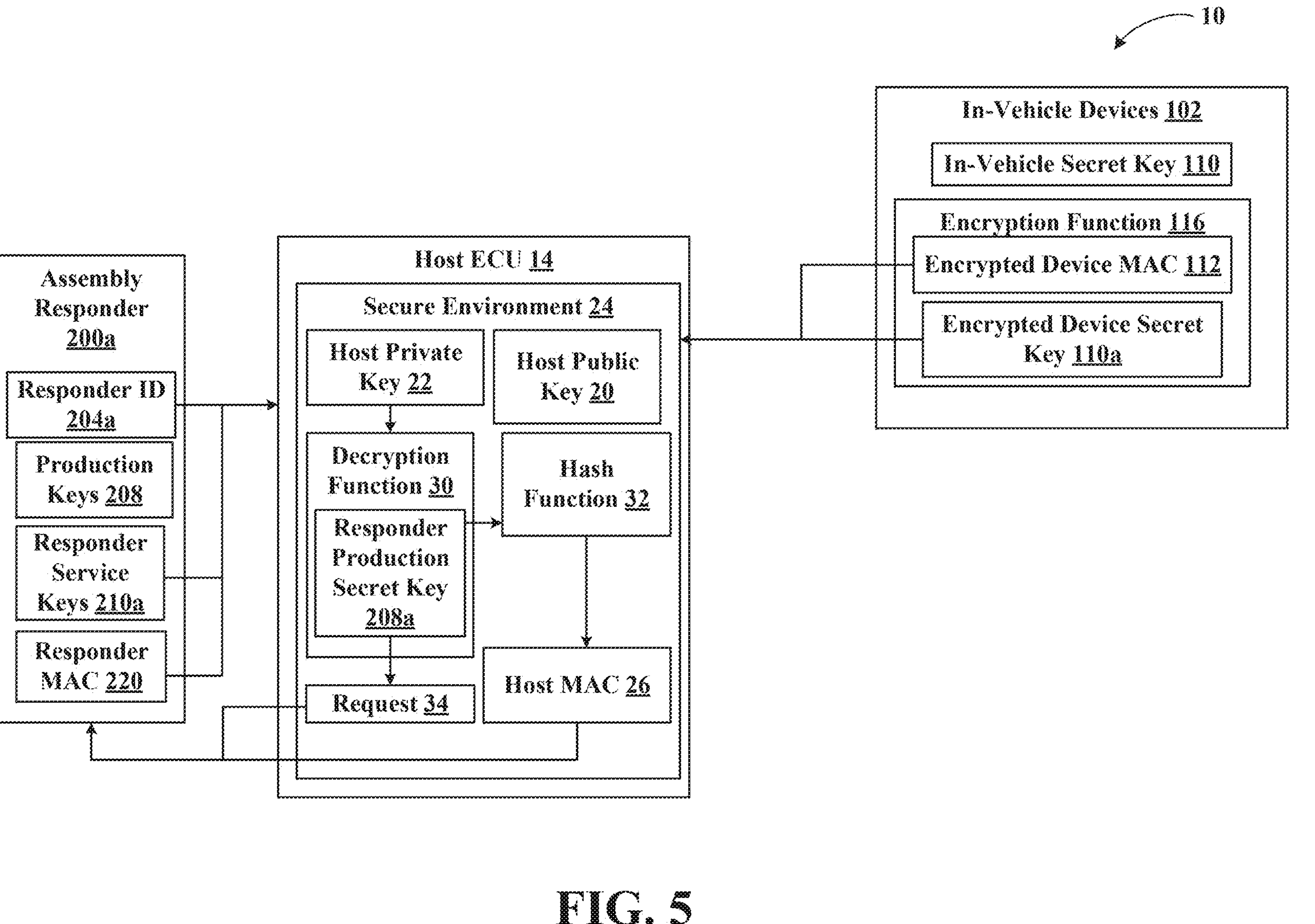
Figure 6:
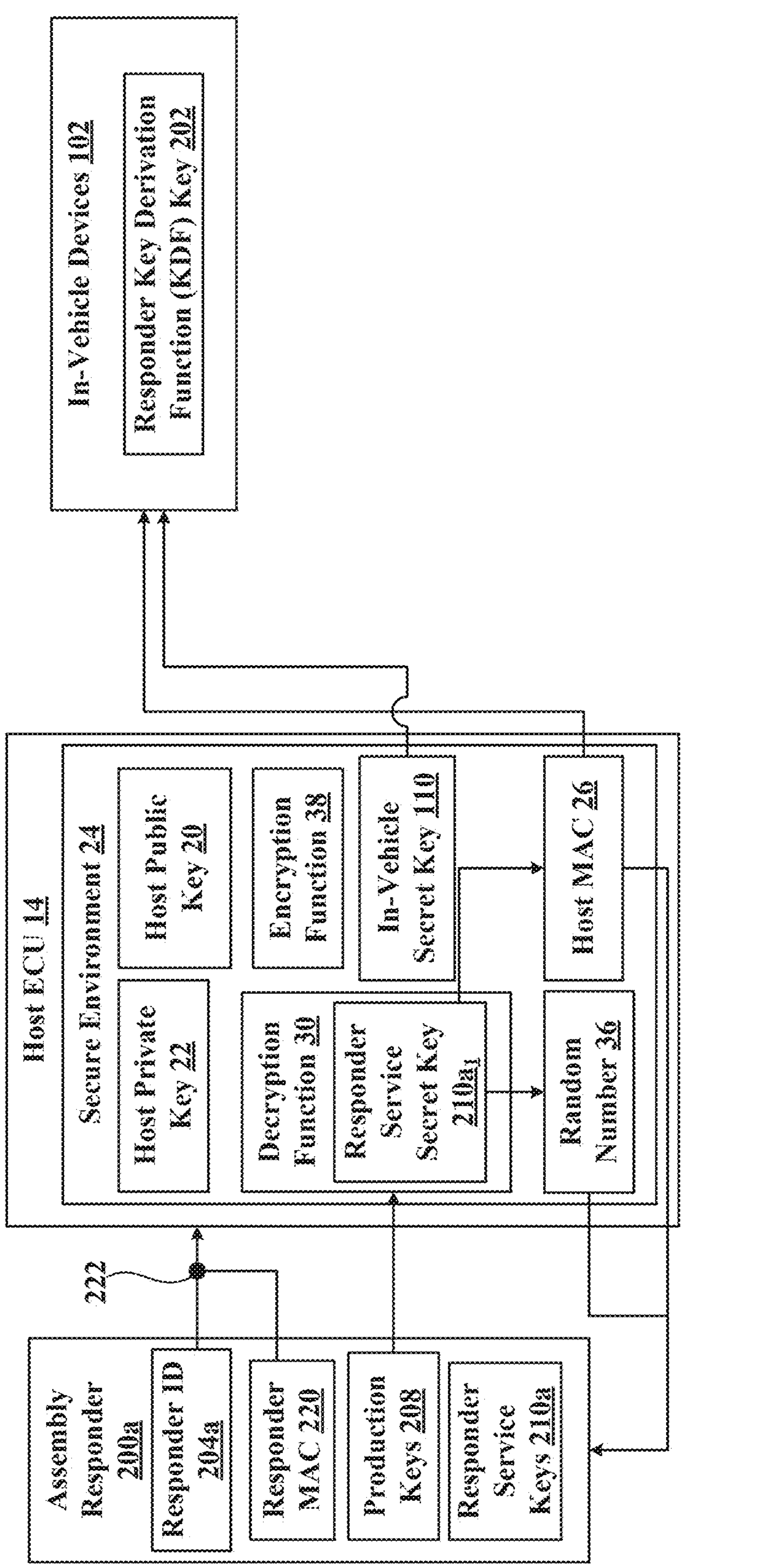
Figure 7:
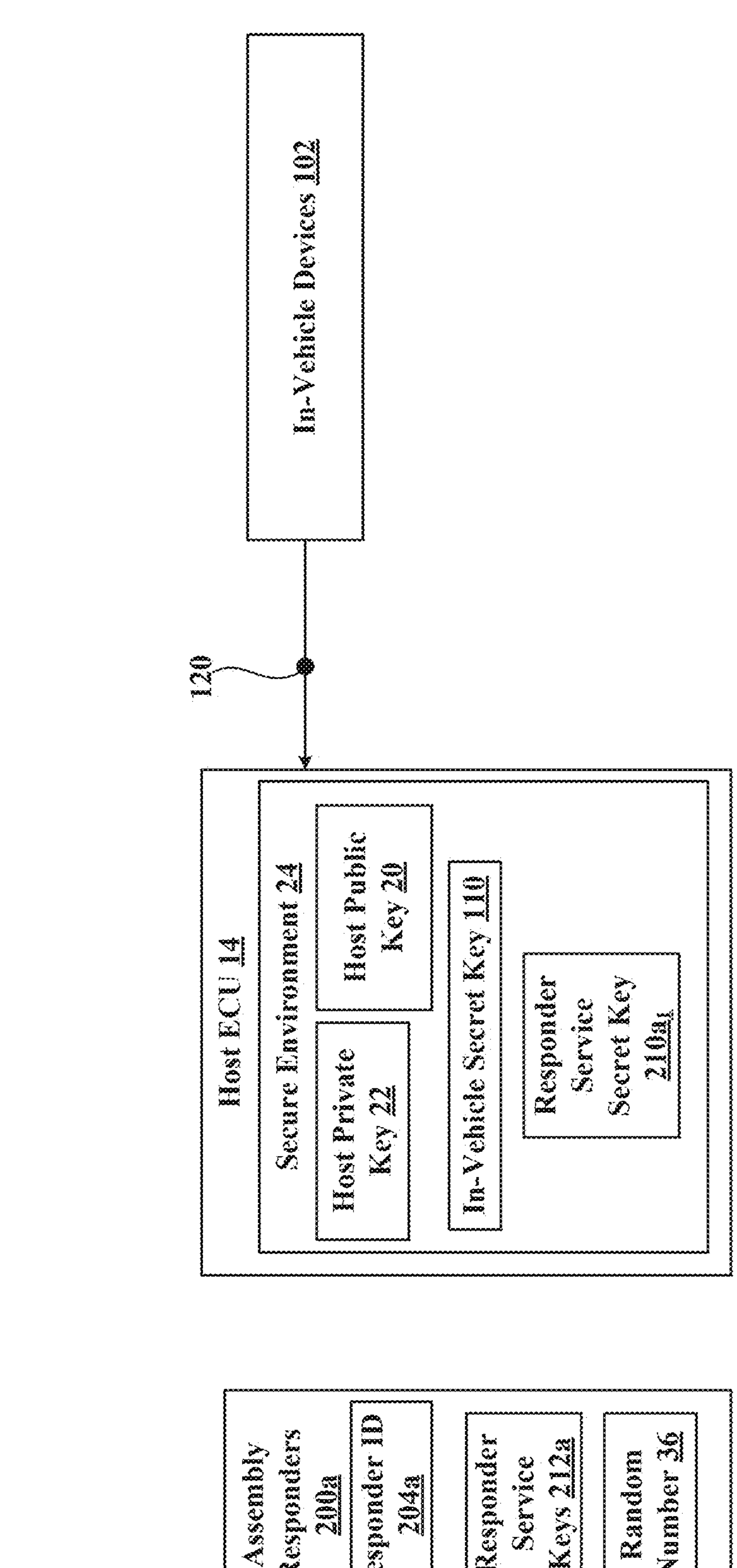

Referring to FIGS. 1-3, an in-vehicle device management system 10 includes a host device 12 and is configured as part of a vehicle 100. The in-vehicle management system 10 interconnects a host electronic control unit (ECU) 14 of the host device 12 with a plurality of in-vehicle devices 102 of the vehicle 100. As described herein, the host ECU 14 may be interchangeable with the host device 12. For example, data processing hardware 16 of the host ECU 14 may be utilized to execute instructions of the in-vehicle device management system 10, described herein, and memory hardware 18 of the host ECU 14 may store the instructions. The host ECU 14 is utilized to bridge between the in-vehicle devices 102 and at least one responder 200 of the vehicle 100. The at least one responder 200 is an in-vehicle device that only interacts directly with the respective host ECU 14, such that the responder 200 does not interact directly with the other in-vehicle devices 102 or potential diagnostic tools. The at least one responder device 200 is an exemplary responder 200 that may be utilized during assembly of the vehicle 100, such that a plurality of responders 200 may be utilized. For simplicity, a singular responder device 200 is described with respect to the in-vehicle device management system 10. However, it is understood that the processes described herein with respect to the singular responder device 200 may be utilized with respect to any number of responder devices 200. Similarly, the in-vehicle device management system 10 may be configured with multiple host ECUs 14 each associated with a singular responder 200.

The in-vehicle device management system 10 is also in communication with a back-office security server 300 via a network 302. The back-office security server 300 is configured to generate a plurality of responder key derivation function (KDF) keys 202 that are supplied to each of the in-vehicle devices 102 and the host device 12. In some instances, a single KDF key 202 may be supplied to the host device 12 and/or one of the in-vehicle devices 102. The in-vehicle devices 102 may include a first set of in-vehicle devices 102*a* and a second set of in-vehicle devices 102*b*. In general, similar actions are executed at each set of the in-vehicle devices 102*a*, 102*b*. Each set of the in-vehicle devices 102*a*, 102*b* may respectively include first assembly devices 104*a* and second assembly devices 104*b*. The assembly devices 104*a*, 104*b* are utilized during initial manufacturing and assembly of the vehicle 100, as opposed to a later servicing event of the vehicle 100. As described in more detail below, in-vehicle devices 102 or responder devices 200 utilized in servicing of the vehicle 100 (i.e., post-assembly) include different credentials from those in-vehicle devices 102 and responder devices 200 used during assembly of the vehicle 100.

For example, the assembly devices 104*a*, 104*b* are provisioned with the responder KDF keys 202. Similarly, the responder devices 200 may include assembly responders 200*a* and service responders 200*b*. Each of the responder devices 200 includes a responder identifier (ID) 204 that may be received by the host device ECU 14. For example, the assembly responders 200*a* are provisioned with a responder identifier (ID) 204*a*, production keys 208, and responder service keys 210. The service responders 200*b* are utilized post-assembly of the vehicle 100 and are only provisioned with a responder ID 204*b* and responder service keys 210*b*. Thus, the production keys 208 are reserved for the assembly responders 200*a*. The separate provisioning of the assembly responders 200*a* and the service responders 200*b* provides a security layer for the in-vehicle device management system 10 by limiting the access to the production keys 208*a*. The limitation of access to the production keys 208 provides a layer of security, such that only authorized providers may have access to the production keys 208 through the processes described herein. Further, the limited access to the production keys 208 advantageously results in the availability of service parts to the general public, such that only the in-vehicle devices 102 and host devices 12 configured for installation at initial assembly have access to creation of the production keys 208.

With further reference to FIGS. 1-3, the in-vehicle devices 102 are provided to a manufacturer of the vehicle 100 from a supplier for use during the assembly process of the vehicle 100. The back-office security server 300 provisions the responder KDF keys 202 to at least one of the host ECU 14 and/or each of the in-vehicle devices 102 for use within the in-vehicle device management system 10. For example, the back-office security server 300 may create a plurality of the responder KDF keys 202 in some implementations, which are used to create the production keys 208, described herein. Each responder KDF key 202 is provisioned to a different supplier (i.e., a different in-vehicle device 102) for use during the assembly process of the vehicle 100. The back-office security server 300 also generates responder IDs 204 for the responder devices 200 using a key derivation function (KDF) 306 with a monotonic counter 304 of the back-office security server 300 and a responder secret key 206 as inputs. The responder secret key 206 is utilized to prevent a third-party adversary from attempting to create responder IDs 204, as the responder secret key 206 is isolated from external exposure and remains at the back-office security server 300.

The back-office security server 300 also generates the production keys 208 of the assembly responders 200*a* by executing a cryptographic algorithm 308. Each production key 208 is created by generating one or more cypher-based message authentication codes (CMACs) 212*a* of the responder ID 204 using one or more responder KDF keys 202. The CMACs 212*a* are then cryptically hashed together to create the responder production keys 208. The back-office security server 300 also generates the responder service keys 210 using the responder ID 204 and a back-office secret key 310 with the KDF 306. The responder devices 200 receives sets of the responder IDs 204 and the production keys 208 and the responder service keys 210 from the back-office security server 300. As mentioned above, the production keys 208 are only provisioned to the assembly responders 200*a*, and the responder IDs 204 and responder service keys 210 are provisioned to both the assembly responders 200*a* and the service responders 200*b*.

Referring now to FIGS. 3-7, the in-vehicle devices 102, including the host device 12, are provisioned with in-vehicle network secret keys 110 from a programming tool 400. For example, a provisioning application 16*a* of the host device 12 may be utilized by the data processing hardware 16 to provision the in-vehicle network secret keys 110 to the in-vehicle devices 102. The in-vehicle network secret keys 110 provide the in-vehicle devices 102 with secure communication with the host device 12 and other in-vehicle devices 102. The host device 12 serves as a central ECU (i.e., the host ECU 14) at which the responder devices 200 may be established. The host ECU 14 generally serves as the centralized communication hub between the responder devices 200 and the in-vehicle devices 102 and diagnostic tools. During assembly, the host ECU 14 is utilized as a bridge between the in-vehicle device 102 and the assembly responder 200*a*. The host ECU 14 reads the responder ID 204*a* and provides the responder ID 204*a* along with a host public key 20 to the in-vehicle devices 102. The host ECU 14 includes the host public key 20 and a host private key 22, which are stored in a secure environment 24 of the host device 12. Alternatively, the host ECU 14 may provide the responder ID 204*a* and the host public key 20 to a secure element within the vehicle 100 (i.e., the secure environment 24 of the host ECU 14 and/or another secure environment of another in-vehicle device 102).

The host ECU 14 generates a host message authentication code (MAC) 26 with the in-vehicle secret key 110 of the host ECU 14 to securely send the public key 20 of the host ECU 14 to the in-vehicle devices 102. The secure environment 24 ensures that only the host public key 20 is being provided before generating the host MAC 26. Ensuring that only the host public key 20 is provided prevents a potentially compromised host device 12 from obtaining the secrets from other in-vehicle devices 102 needed to create the responder production keys 208. Once the in-vehicle devices 102 receive the host public key 20, the responder ID 204*a*, and the host MAC 26, each device 102 uses its responder KDF key 202 to generate a device MAC 112. For example, the device MAC 112 may be generated at each of the in-vehicle devices 102 using the responder KDF key 202. For example, the in-vehicle devices 102 may utilize a MAC function 114 to generate the device MAC 112 over the responder ID 204*a*. The device MAC 112 may then undergo an encryption function 116 using the host public key 20 and the in-vehicle secret key 110. Each in-vehicle device 102 is equipped with a device secure environment 102*a* in which the responder IDs 204*a* may be stored before further operations are performed.

The in-vehicle device management system 10 may limit the number of operations per responder ID 204*a* as an added security layer. Further, during this stage of the operations, the back-office security server 300 may be inaccessible by the in-vehicle devices 102 and the host device 12. After the device MAC 112 undergoes the encryption function 116, the in-vehicle devices 102 provide the encrypted device MAC 112 protected with a MAC generated with the in-vehicle secret key 110 to the host ECU 14. The encrypted device MAC 112 is a device-unique secret 118 created using the device-unique responder KDF key 202. The secure environment 24 of the host ECU 14 executes a decryption function 30 using the host private key 22 and then executes a hash function 32 over each encrypted device MAC 112 that the host device 12 received and decrypted to obtain a responder production secret key 208*a*. The host ECU 14 executes a request 34 and sends the request 34 to the assembly responder 200*a*. The request 34 is secured by the host MAC 26 which is generated using the responder production secret key 208*a*. The request 34 is designed to obtain the responder service key 210*a* from the assembly responder 200*a*.

Upon receiving the request 34, the assembly responder 200*a* provides its responder service secret key 210*a*1 to the host ECU 14. In doing so, the assembly responder 200*a* encrypts the responder service secret key 210*a*1 with its device-unique responder production secret key 208*a* and generates a MAC 220 over the encrypted service secret key using its production secret key 208*a*. The host ECU 14 verifies the responder MAC 220 from the assembly responder 200*a* and receives, in response to the request 34, the responder service secret key 210*a*1. The responder service secret key 210*a*1 is encrypted with the responder production secret key 208*a*. The host ECU 14 executes the decryption function 30 to decrypt the encrypted responder service secret key 210*a*1 using the responder production secret key 208*a*. The decrypted responder service secret key 210*a*1 is used to verify the legitimacy of the assembly responder 200*a* to the host ECU 14, and the secure environment 24 of the host ECU 14 stores the responder service secret key 210*a*1 in the memory hardware 18. The host ECU 14 subsequently generates a random number 36 and encrypts the random number 36 with the responder service secret key 210*a*1 using an encryption function 38 of the host ECU 14.

The encrypted random number 36 and responder ID 204 are MAC'd using the responder service secret key 210*a* and are sent from the host ECU 14 to the assembly responder 200*a*. The random number 36 may also be encrypted with the responder service secret key 210. In response, the assembly responder 200*a* provides a confirmation 222 to the host ECU 14 and overwrites the responder production key 208 with the random number 36. As a result, the previous responder production secret key 208*a* is rendered inactive or otherwise unusable in the event of the responder KDF keys 202 being compromised. For example, the responder production secret keys 208*a* may be changed or otherwise altered or adjusted at the assembly responders 200*a* if a compromising event occurs. If a compromising event is detected, the responder production secret keys 208*a* may be changed prior to assembly with the vehicle 100, avoiding potential vehicle recall scenarios.

Once the assembly responder 200*a* overwrites the responder production key 208 with the random number 36, the assembly responder 200*a* sends a confirmation 222 to the host ECU 14. Upon receipt of the confirmation 222, the host ECU 14 communicates with the in-vehicle devices 102 to wipe or otherwise erase the responder KDF keys 202. For example, the host ECU 14 may issue a message secured with a MAC 26 generated using the in-vehicle secret key 110 to clear the responder KDF keys 202 from any memory (i.e., short-term, non-volatile, etc.) of the in-vehicle devices 102. In response, the in-vehicle devices 102 remove the responder KDF keys 202 and send an acknowledgement response 120 to the host ECU 14. Once received, the host ECU 14 also wipes or otherwise erases the responder KDF keys 202 from the secure environment 24 of the host ECU 14.

Figure 8:
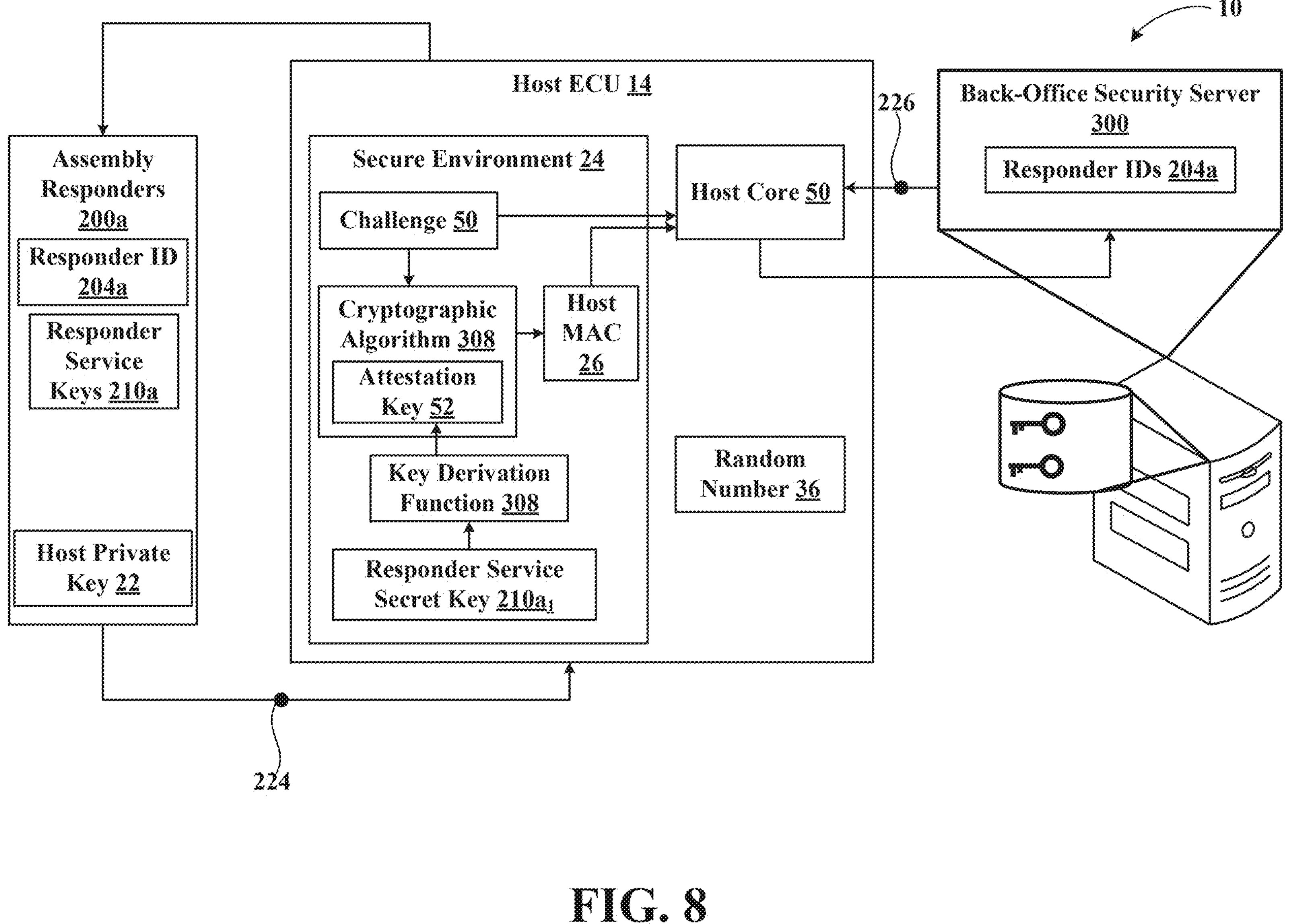
FIG. 8 is a schematic diagram of a responder attestation process of an in-vehicle device management system according to the present disclosure.
Figure 9:
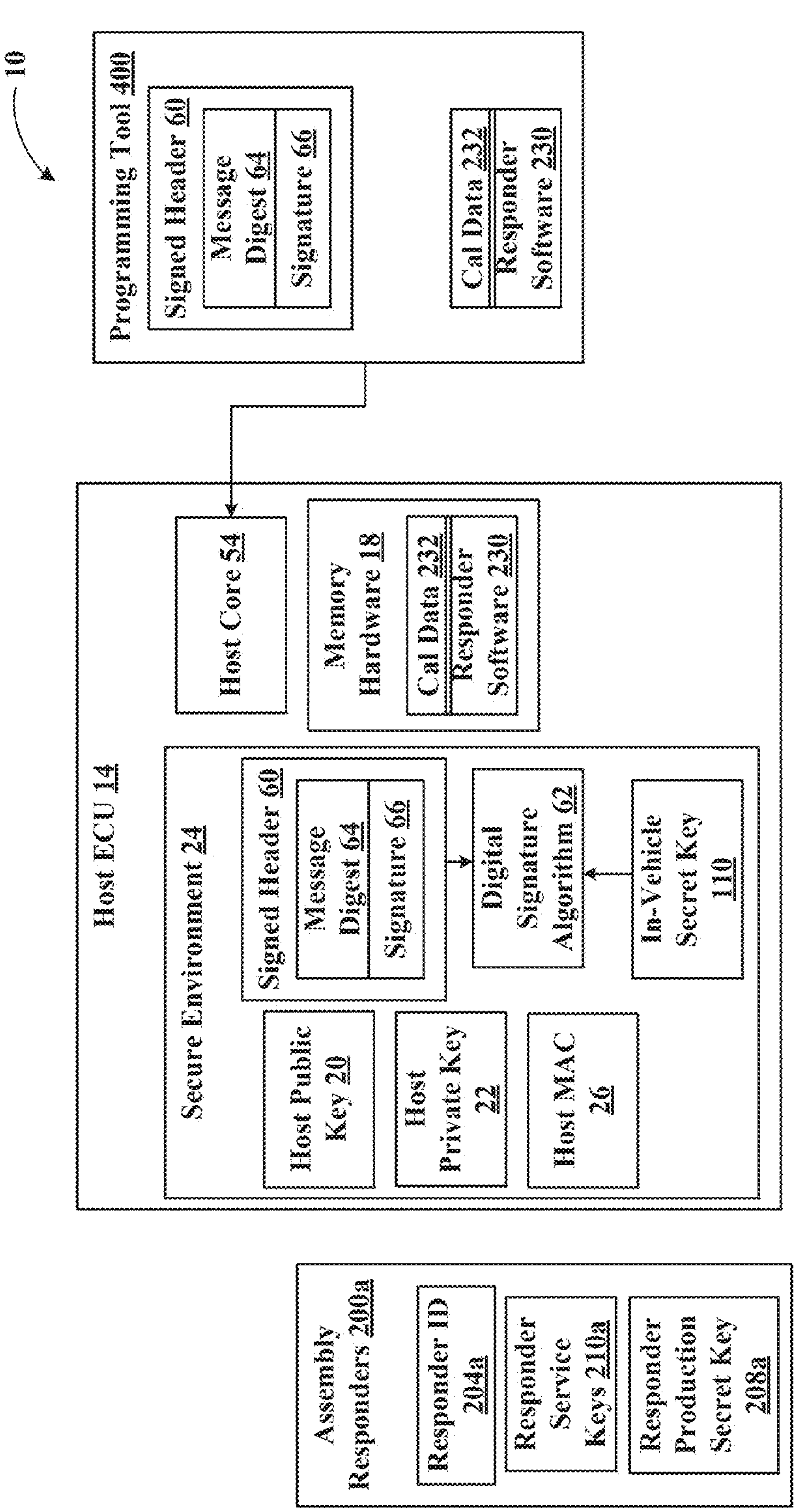
FIGS. 9 and 10 are schematic diagrams of programming of at least one responder of an in-vehicle device management system according to the present disclosure.
Figure 10:
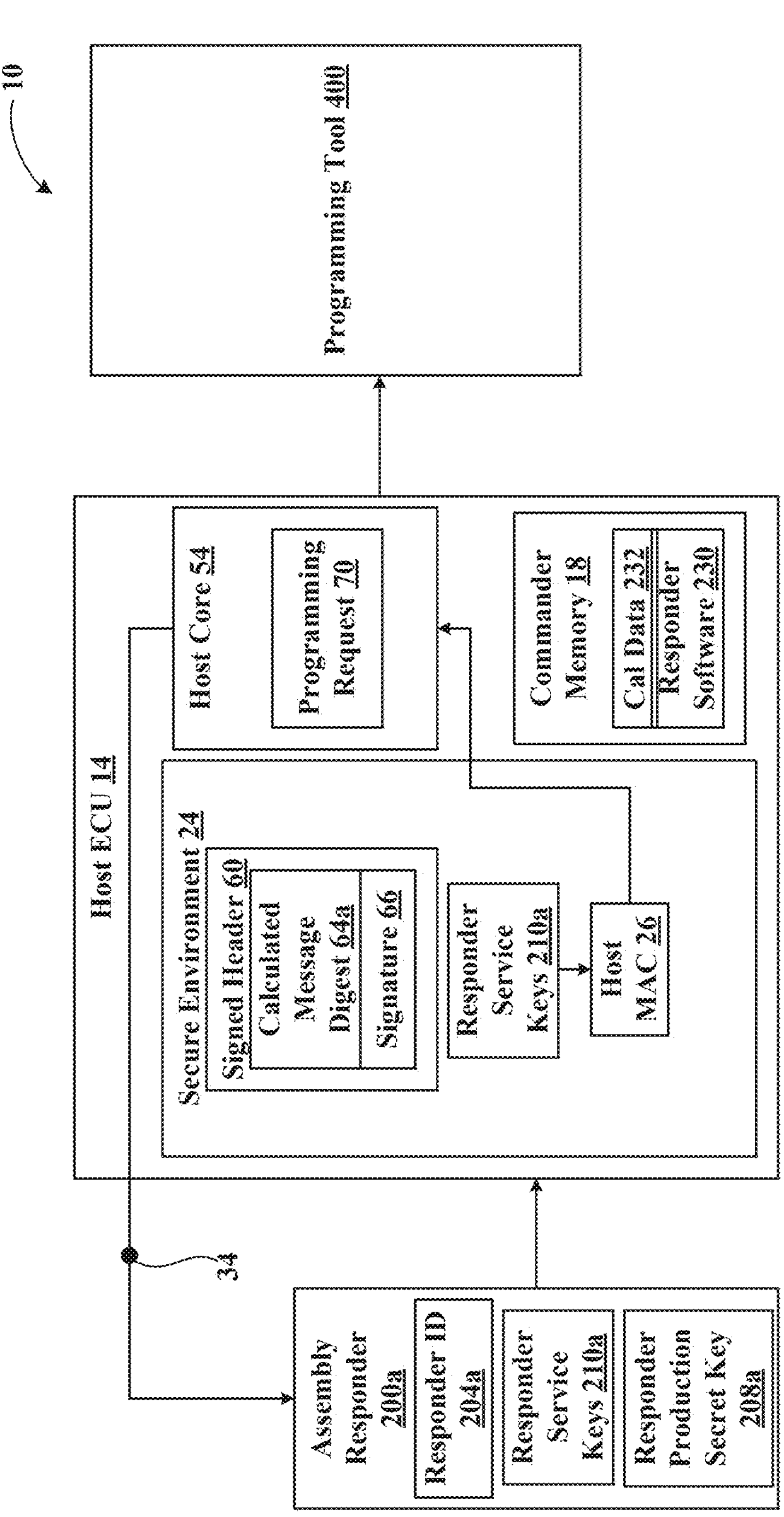
Figure 11:
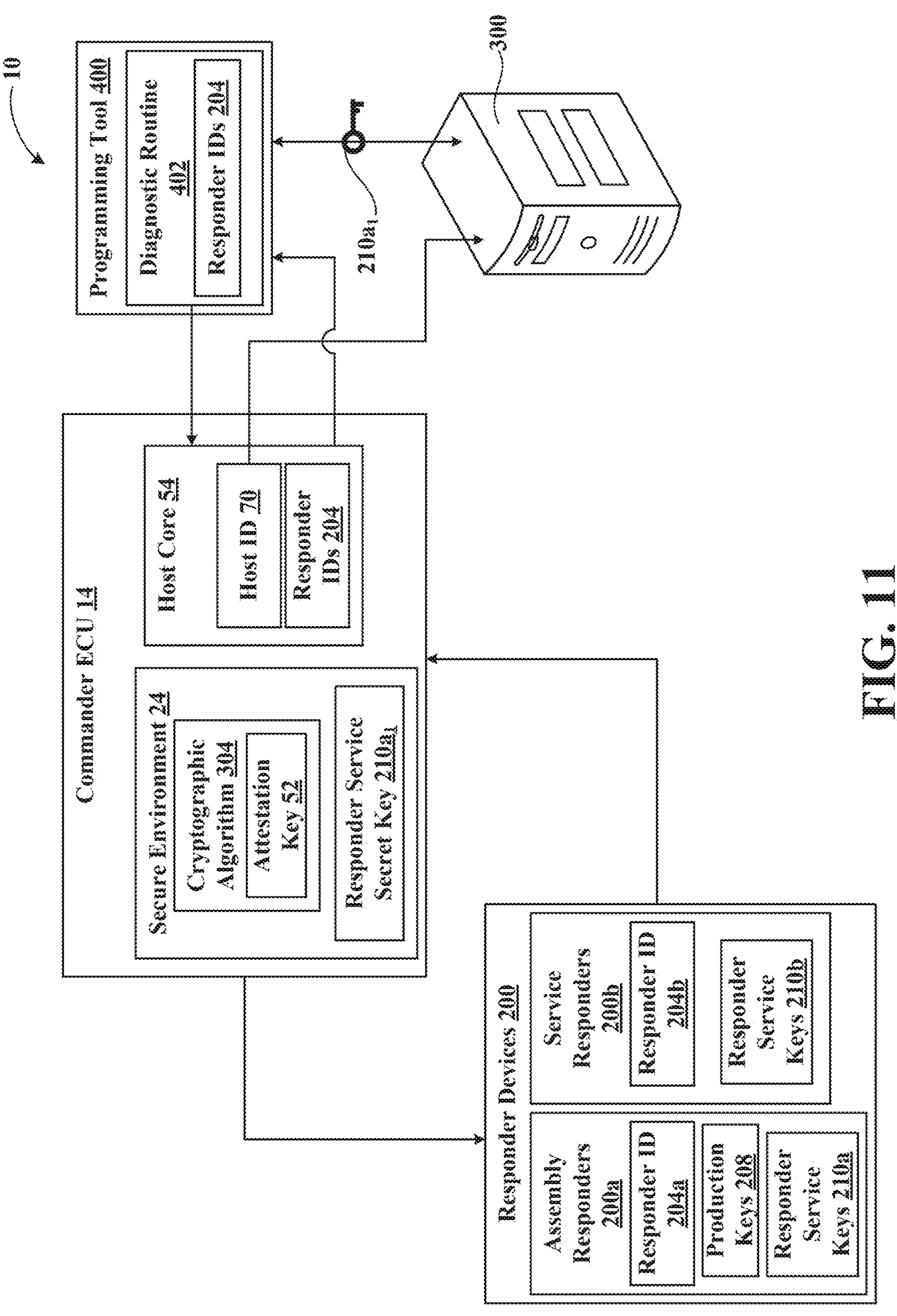
FIG. 11 is a schematic diagram of a service replacement of at least one of a host and at least one responder of an in-vehicle device management system according to the present disclosure.

Referring now to FIGS. 3 and 8, the in-vehicle device management system 10 is configured to require attestation from the responder device 200. During attestation, the in-vehicle device management system 10 checks or otherwise verifies the legitimacy of the responder device 200. The host ECU 14 requests that the secure environment 24 provides a challenge 50 with the host MAC 26. During the attestation phase, the host MAC 26 may be generated from an attestation key 52. The attestation key 52 is derived from the responder service secret key 210*a*1 using the cryptographic algorithm 308. The host ECU 14 provides the host MAC 26 including the challenge 50 to the responder 200, and the responder 200 verifies the host MAC 26. Once the host MAC 26 is verified by the responder 200, the responder 200 provides a response 224 with a MAC over the response generated using the attestation key 52 to the host ECU 14. The host ECU 14 verifies the response 224 to perform a local verification of the authenticity of the assembly responder 200*a*. The back-office security server 300 is configured to send a remote diagnostic request 226 to read the responder ID 204*a*, and a host core 54 of the host ECU 14 provides the responder ID 204*a* to the back-office security server 300. The back-office security server 300 determines whether the responder ID 204*a* is legitimate by identifying that the responder ID 204*a* was provided to the supplier of the in-vehicle devices 102.

With reference to FIGS. 3 and 9-11, the programming tool 400 is utilized to provide responder software 230 and a signed header 60 protecting the authenticity of the responder software 230 to the hose core 54. The responder software 230 may be packaged as calibration (cal) data 232 to the host ECU 14. The host core 54 provides a signed header 60 of the updated responder software 230 to the secure environment 24 to verify the authenticity of the responder software update using the host public key 20, and the host ECU 14 writes the responder software 230 into the memory hardware 18. The signed header 60 is provided to the secure environment 24 to verify the signature 66 over the data within the signed header 60, including a message digest 64 of the responder software update 230 from the programming tool 400. Once the responder software 230 is stored at the memory hardware 18, the host ECU 14 requests the secure environment 24 to generate the host MAC 26 over the responder software 230 using the responder service secret key 210*a*1. Alternatively, the secure environment 24 may generate a digital signature over the responder software 230 using a private key that is associated with the public key stored in the responder. In this instance, the responder 200 would use the public key to verify the authenticity of the software update 230.

The secure environment 24 generates the host MAC 26 while generating a calculated message digest 64*a* over the responder software update 230. The secure environment 26 provides the host MAC 26 to the host core 54 if the calculated message digest 64*s* matches the message digest 64 from the programming tool 400. By verifying the calculated message digest 64*a* with the message digest 64 provided by the programming tool 400, the in-vehicle device management system 10 is able to identify if there was an attempt to corrupt the responder 200 and prevent any further action if an attempt was made. The host ECU 14 sends a request 34 to the responder 200 to update software of the responder 200 with the responder software 230. The responder 200 provides a response to the host ECU 14 to verify whether the programming of the responder software 230 is authorized.

To enable the responder 200 to verify the authenticity of the responder software 230, the host ECU 14 sends the host MAC 26 generated over the responder software 230 to the assembly responder 200*a* for verification and programming. The assembly responder 200*a* provides a response to the host ECU 14 indicating whether the programming of the responder software 230 was successful. The host ECU 14 then provides a response 34 to the programming tool 400 indicating whether the programming of the assembly responder 200*a* was successful. Upon successful completion of the various operations described above, the assembly responder 200*a* may be assembled with the vehicle 100 as part of the in-vehicle device management system 10. The in-vehicle device management system 10 may continue to monitor the various devices (i.e., the host device 12, the in-vehicle devices 102, and the responder device(s) 200) during operation of the vehicle 100.

In some instances, a responder device 200 may need to be replaced throughout the useful life of the vehicle 100. For example, an assembly responder 200*a* may need to be replaced with a new, service responder 200*b*. In this instance, the programming tool 400 may detect that the assembly responder 200*a* should be replaced and sends a diagnostic routine 402 to the host ECU 14 to learn the new responder ID 204. The host ECU 14 reads the responder IDs 204 and sends the responder IDs 204 and a host ID 70 with a MAC generated over the IDs 204, 70 using a secret key shared with the back-office security server 300 to the back-office security server 300 to obtain the responder service secret keys 210*a*1. The back-office security server 300 checks the host ID 70 and MAC to verify the legitimacy of the request and checks the responder IDs 204 to verify that the provided responder IDs 204 match the responder IDs 204 provisioned to the suppliers. If the responder IDs 204 are legitimate, then the back-office security server 300 derives the responder service secret keys 210*a*1 from the responder IDs 204 using the responder secret key 206 stored in the back-office security server 300.

The back-office security server 300 may encrypt the responder service secret keys 210*a*1 with a secret key derived from the host ID 70, which is only accessible by the secure environment 24 of the host ECU 14. The back-office security server 300 may limit the number of responder service secret key 210*a*1 that may be provided to the host ECU 14. The back-office security server 300 provides encrypted responder service secret key 210*a*1 to the programming tool 400, and the programming tool 400 provides the encrypted responder service secret key 210*a*1 to the host ECU 14. The secure environment 24 of the host ECU 14 verifies and decrypts the responder service secret key 210*a*1 and saves the responder service secret key 210*a*1. As described above with respect to FIG. 8, the host ECU 14 performs the challenge 50 and response 224 with the responder devices 200. If the responder devices 200 are legitimate, then the host ECU 14 provides a positive response to the diagnostic routine 402 of the programming tool 400.

Figure 12:
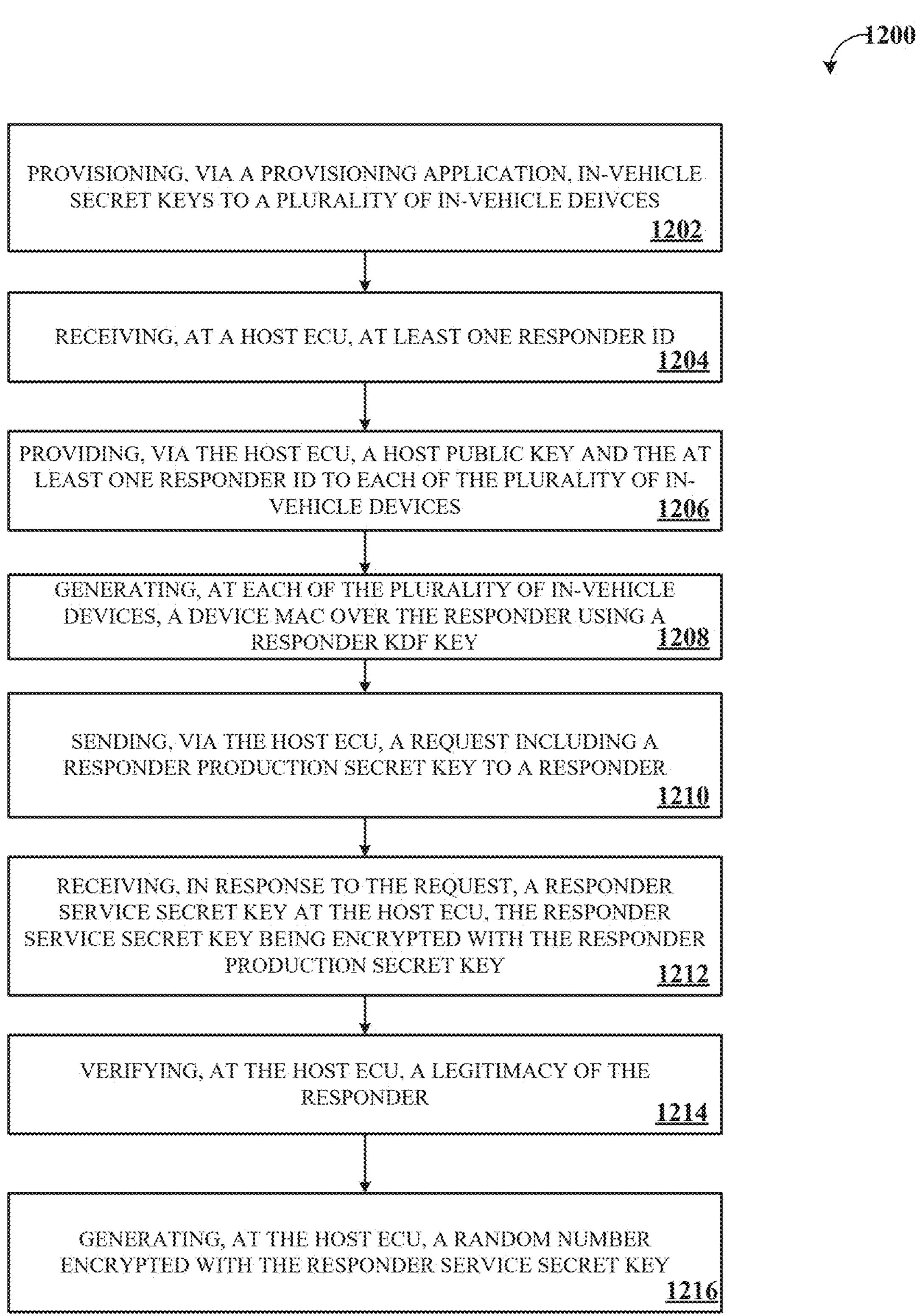
FIG. 12 illustrates an exemplary method for executing an in-vehicle device management system according to the present disclosure.
Figure 13:
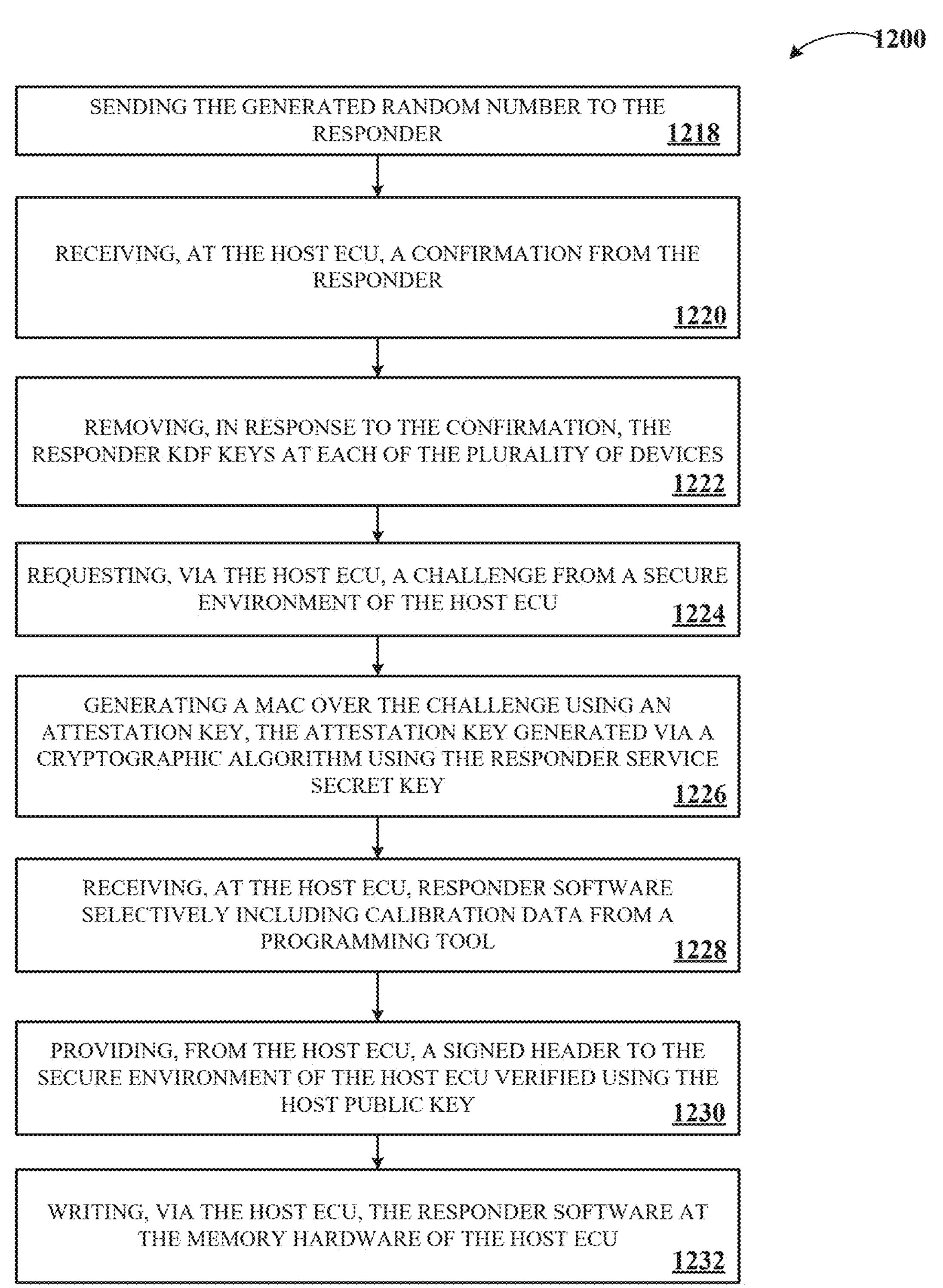
FIG. 13 illustrates the exemplary method of FIG. 12 continued for executing the in-vehicle device management system.

With reference now to FIGS. 12 and 13, an exemplary method 1200 for executing the in-vehicle device management system 10 is illustrated. At 1202, a provisioning application 16*a* of data processing hardware 16 provisions in-vehicle secret keys 110 to a plurality of in-vehicle devices 102. The host ECU 14 receives, at 1204, at least one responder identifier (ID) 204 and provides, at 1206, a host public key 20 and the at least one responder ID 204 to each of the plurality of in-vehicle devices 102. The in-vehicle devices 102 may be a secure element within the host ECU 14 and/or a secure element on another, separate ECU. Each of the plurality of in-vehicle devices 102 generates, at 1208, a device message authentication code (MAC) 112 over the responder ID 204 using a responder key derivation function (KDF) key 202. The host ECU 14 sends, at 1210, a request 34 including a responder production secret key 208*a* to a responder 200 and receives, at 1212, in response to the request 34, at 1210, a responder service secret key 210*a*1 at the host ECU 14.

The responder service secret key 210*ai* is encrypted with the responder production secret key 208*a*. The host ECU 14 verifies, at 1214, a legitimacy of the responder 200 and generates, at 1216, a random number 36 encrypted with the responder service secret key 210*a*1. The generated random number 36 is sent, at 1218, to the responder 200. The host ECU 14 receives, at 1220, a confirmation 222 from the responder 200. At 1222, the responder KDF keys 202 are removed, in response to the confirmation 222, at each of the plurality of devices 102. The host ECU 14 requests, at 1224, a challenge 50 from a secure environment 24 of the host ECU 14.

At 1226, a MAC is generated over the challenge 50 using an attestation key 52. The attestation key 52 is generated via a cryptographic algorithm 308 using the responder service secret key **210*a*1. The host ECU 14 receives, at 1228, responder software 230 and optionally or selectively including calibration data 232 from a programming tool 400. A signed header 60 is provided, at 1230, from the host ECU 14 to the secure environment 24 of the host ECU 14 verified using the host public key 20. The responder software 230 is written, at 1232, via the host ECU 14, at the memory hardware 18 of the host ECU 14**.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

provisioning, via a provisioning application, in-vehicle secret keys to a plurality of in-vehicle devices;

receiving, at a host electronic control unit (ECU), at least one responder identifier (ID);

providing, via the host ECU, a host public key and the at least one responder ID to one of one or more of the plurality of in-vehicle devices, a secure element of the host ECU, or one of the plurality of in-vehicle devices;

generating, at each of the plurality of in-vehicle devices, a device message authentication code (MAC) over the at least one responder ID using a responder key derivation function (KDF) key;

sending, via the host ECU, a request including a responder production secret key to a responder;

receiving, in response to the request, a responder service secret key at the host ECU, the responder service secret key being encrypted with the responder production secret key;

verifying, at the host ECU, a legitimacy of the responder;

requesting, via the host ECU, a challenge from a secure environment of the host ECU;

generating a MAC over the challenge using an attestation key, the attestation key generated via a cryptographic algorithm using the responder service secret key;

generating, at the host ECU, a random number corresponding to a new responder production secret key encrypted with the responder service secret key;

sending the generated random number to the responder;

receiving, at the host, a confirmation from the responder; and removing, in response to the confirmation, the responder KDF keys at each of the plurality of in-vehicle devices.

2. The method of claim 1, wherein providing the host public key and the at least one responder ID includes generating a device MAC with an in-vehicle secret key of the host ECU.

3. The method of claim 1, wherein generating the device MAC includes generating the device MAC over the at least one responder ID and encrypting the device MAC with the host public key.

4. The method of claim 3, further including providing, via each of the plurality of in-vehicle devices, the encrypted device MAC to the host ECU, the encrypted device MAC including a device-unique secret.

5. The method of claim 4, further including decrypting, via the host ECU, the encrypted device MAC.

6. The method of claim 1, wherein receiving the responder service secret key includes receiving an encrypted responder MAC from the responder.

7. The method of claim 6, wherein verifying the legitimacy of the responder includes decrypting the encrypted responder MAC and the encrypted responder service secret key from the responder using the responder production secret key and storing the responder service secret key in memory hardware of the host ECU.

8. The method of claim 1, further including:

providing, at the responder, the challenge;

verifying the challenge via the responder; and providing, via the responder, a response with a MAC generated using the attestation key derived from the responder service secret key to the host ECU.

9. The method of claim 1, further including:

receiving, at the host ECU, responder software selectively including calibration data from a programming tool;

providing, from the host ECU, a signed header to a secure environment of the host ECU verified using the host public key; and writing, via the host, the responder software at a memory hardware of the host ECU.

10. The method of claim 9, further including:

executing, via a programming tool, a diagnostic routine;

receiving, at the programming tool, a host ID and the responder ID;

obtaining, from a back-office security server, the responder service secret key;

verifying, at the host ECU, the responder service secret key; and providing, via the host ECU, a positive response to the diagnostic routine to the programming tool.

11. An in-vehicle device management system comprising:

data processing hardware; and memory hardware in communication with the data processing hardware, the memory hardware storing instructions that when executed on the data processing hardware cause the data processing hardware to perform operations comprising:

provisioning, via a provisioning application, in-vehicle secret keys to a plurality of in-vehicle devices;

receiving, at a host electronic control unit (ECU), at least one responder identifier (ID);

providing, via the host ECU, a host public key and the at least one responder ID to each of the plurality of in-vehicle devices;

generating, at each of the plurality of in-vehicle devices, a device message authentication code (MAC) over the at least one responder ID using a responder key derivation function (KDF) key;

sending, via the host ECU, a request including a responder production secret key to a responder;

receiving, in response to the request, a responder service secret key at the host ECU, the responder service secret key being encrypted with the responder production secret key;

verifying, at the host ECU, a legitimacy of the responder;

generating, at the host ECU, a random number corresponding to a new responder production secret key encrypted with the responder service secret key;

sending the generated random number to the responder;

receiving, at the host ECU, a confirmation from the responder;

removing, in response to the confirmation, the responder KDF keys at each of the plurality of in-vehicle devices;

requesting, via the host ECU, a challenge from a secure environment of the host ECU;

generating a MAC over the challenge using an attestation key, the attestation key generated via a cryptographic algorithm using the responder service secret key;

receiving, at the host ECU, responder software selectively including calibration data from a programming tool;

providing, from the host ECU, a signed header to the secure environment of the host ECU verified using the host public key; and writing, via the host ECU, the responder software at the memory hardware of the host ECU.

12. The in-vehicle device management system of claim 11, wherein providing the host public key and the at least one responder ID includes generating the device MAC with an in-vehicle secret key of the host ECU.

13. The in-vehicle device management system of claim 11, wherein generating the device MAC includes generating the device MAC over the at least one responder ID using the responder KDF keys and encrypting the device MAC with the host public key and the at least one responder ID.

14. The in-vehicle device management system of claim 13, further including providing, via each of the plurality of in-vehicle devices, the encrypted device MAC to the host ECU, the encrypted device MAC including a device-unique secret.

15. The in-vehicle device management system of claim 14, further including decrypting, via the host ECU, the encrypted device MAC.

16. The in-vehicle device management system of claim 11, wherein receiving the responder service secret key includes receiving an encrypted responder MAC from the responder.

17. The in-vehicle device management system of claim 16, wherein verifying the legitimacy of the responder includes decrypting the encrypted responder MAC and the encrypted responder service secret key from the responder using the responder production secret key and storing the responder service secret key in memory hardware of the host ECU.

18. The in-vehicle device management system of claim 11, further including:

providing, at the responder, the challenge;

verifying the challenge via the responder; and providing, via the responder, the attestation key derived from the responder service secret key to the host ECU.

19. The in-vehicle device management system of claim 18, further including:

executing, via a programming tool, a diagnostic routine;

receiving, at the programming tool, a host ID and the responder ID;

obtaining, from a back-office security server, the responder service secret key;

verifying, at the host ECU, the responder service secret key; and providing, via the host ECU, a positive response to the diagnostic routine to the programming tool.

20. The method of claim 1, further including:

performing, via the host ECU, the challenge and response with the responder; and providing, via the host ECU, a positive response to the programming tool.

* * * * *